(12) United States Patent
Chard et al.

(10) Patent No.: US 7,130,984 B2
(45) Date of Patent: Oct. 31, 2006

(54) FIRST-IN FIRST-OUT MEMORY SYSTEM WITH SHIFT REGISTER FILL INDICATION

(75) Inventors: Gary F. Chard, Richardson, TX (US); Osman Koyuncu, Plano, TX (US); T-Pinn R. Koh, Allen, TX (US); Christopher A. Opoczynski, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 266 days.

(21) Appl. No.: 10/726,913

(22) Filed: Dec. 3, 2003

(65) Prior Publication Data

US 2005/0122794 A1    Jun. 9, 2005

(51) Int. Cl.
*G06F 12/00* (2006.01)
(52) U.S. Cl. .................. 711/219; 365/189.04
(58) Field of Classification Search ........... 711/219; 365/189.04
See application file for complete search history.

(56) References Cited

U.S. PATENT DOCUMENTS

| | | | |
|---|---|---|---|
| 5,345,419 A * | 9/1994 | Fenstermaker et al. .......... | 365/189.04 |
| 5,473,756 A * | 12/1995 | Traylor ............. | 710/57 |
| 5,812,465 A * | 9/1998 | Knaack et al. ........... | 365/200 |
| 6,696,854 B1 * | 2/2004 | Momtaz et al. ........... | 326/37 |
| 6,857,043 B1 * | 2/2005 | Lee et al. ................. | 711/109 |

* cited by examiner

Primary Examiner—Hiep T. Nguyen
(74) Attorney, Agent, or Firm—W. James Brady, III; Frederick J. Telecky, Jr.

(57) ABSTRACT

An electronic device (10). The device comprises a memory structure (12) comprising an integer M of word storage locations. The device further comprises a write shift register ($SR_{WT}$) for storing a sequence of bits. The sequence in the write shift register comprises a number of bits equal to a ratio of $1/R_1$ times the integer M. The device further comprises circuitry (16) for providing a write clock cycle to the write shift register for selected write operations with respect to any of the word storage locations. In response to each write clock cycle, received from the circuitry for providing the write clock cycle, the write shift register shifts the sequence in the write shift register. Further, one bit in the sequence in the write shift register corresponds to an indication of one of the memory word storage locations into which a word will be written. The device further comprises a read shift register ($SR_{RD}$) for storing a sequence of bits. The sequence in the read shift register comprises a number of bits equal to a ratio of $1/R_2$ times the integer M. The device further comprises circuitry (16) for providing a read clock cycle to the read shift register for selected read operations with respect to any of the word storage locations. In response to each read clock cycle, received from the circuitry for providing the read clock cycle, the read shift register shifts the sequence in the read shift register. Further, one bit in the sequence in the read shift register corresponds to an indication of one of the memory word storage locations from which a word will be read. Lastly, the device comprises circuitry ($18_x$) for evaluating selected bits in the sequence in the write register relative to selected bits in the sequence in the read register for detecting a level of data fullness in the memory structure.

28 Claims, 6 Drawing Sheets

| BIT LOCATION | 7 | 6 | 5 | 4 | 3 | 2 | 1 | 0 | SEQUENCE |
|---|---|---|---|---|---|---|---|---|---|
| | 1 | 0 | 0 | 0 | 0 | 0 | 1 | 1 | $SR_{WT}$ |
| | 0 | 0 | 0 | 0 | 0 | 1 | 1 | 1 | $SR_{RD\_1}$ |
| | 0 | 0 | 0 | 0 | 1 | 1 | 1 | 0 | $SR_{RD\_2}$ |
| | 0 | 0 | 0 | 1 | 1 | 1 | 0 | 0 | $SR_{RD\_3}$ |
| | 0 | 0 | 1 | 1 | 1 | 0 | 0 | 0 | $SR_{RD\_4}$ |
| | 0 | 1 | 1 | 1 | 0 | 0 | 0 | 0 | $SR_{RD\_5}$ |
| | 1 | 1 | 1 | 0 | 0 | 0 | 0 | 0 | $SR_{RD\_6}$ |

*FIG. 6*

| BIT LOCATION | 7 | 6 | 5 | 4 | 3 | 2 | 1 | 0 | SEQUENCE |
|---|---|---|---|---|---|---|---|---|---|
| | 1 | 0 | 0 | 0 | 0 | 0 | 1 | 1 | $SR_{RD}$ |
| | 0 | 0 | 0 | 0 | 0 | 1 | 1 | 1 | $SR_{WT\_1}$ |
| | 0 | 0 | 0 | 0 | 1 | 1 | 1 | 0 | $SR_{WT\_2}$ |
| | 0 | 0 | 0 | 1 | 1 | 1 | 0 | 0 | $SR_{WT\_3}$ |
| | 0 | 0 | 1 | 1 | 1 | 0 | 0 | 0 | $SR_{WT\_4}$ |
| | 0 | 1 | 1 | 1 | 0 | 0 | 0 | 0 | $SR_{WT\_5}$ |
| | 1 | 1 | 1 | 0 | 0 | 0 | 0 | 0 | $SR_{WT\_6}$ |

FIRST-IN FIRST-OUT MEMORY SYSTEM WITH SHIFT REGISTER FILL INDICATION

CROSS-REFERENCES TO RELATED APPLICATIONS

This case is related to U.S. patent application Ser. No. 10/726,887, entitled "First-in First-out Memory System With Single Bit Collision Detection" (TI-36900), filed on the same date as the present application, now U.S. Pat. No. 6,996,015.

STATEMENT REGARDING FEDERALLY SPONSORED RESEARCH OR DEVELOPMENT

Not Applicable.

BACKGROUND OF THE INVENTION

The present embodiments relate to electronic devices and circuits and are more particularly directed to such devices and circuits that include a first-in first-out ("FIFO") memory system that includes shift registers from which a level of data fullness of the FIFO is indicated.

Electronic circuits are prevalent in numerous applications, including those used in personal, business, and other devices. Demands of the marketplace affect many aspects of the design of these circuits, including factors such as device complexity, size, and cost. Various of these electronic circuits include some aspect of digital signal processing and, quite often, these circuits include storage devices that operate on a FIFO basis. As is well-known in the art, such FIFO circuits are so named because data words are read from the circuit in the same order as they were written to the circuit. As a storage device, the FIFO is also sometimes referred to as a FIFO memory or a FIFO random access memory ("RAM"). Typically, a FIFO is a logical array for storing a number of data words. The size of each data word in the FIFO depends on the application and may be any number of bits, where 4 bits, 8 bits, 16 bits, and 32 bits are common examples, while any number of bits per word may be implemented based on the application.

A FIFO has a number of word storage locations, and typically in the prior art any of these locations may be indicated, or "addressed," during operation of the FIFO by both a read pointer and a write pointer. Typically, the read pointer indicates the word storage location from which a next word will be read, and the write pointer indicates the word storage location into which a next word will be written. The number of word storage locations in a given FIFO also is typically dictated at least in part by the application. In view of that application, the FIFO design is often determined in an effort to satisfy data requirements while minimizing this number of storage locations so as to avoid unnecessarily enlarging the FIFO. Typically, however, with the designed minimized number of word storage locations, there is an expectation that the pointers may at some instance converge on one another. More specifically, if numerous read operations occur with corresponding advancement of the read pointer, while the write pointer does not advance or does not advance at approximately the same rate, then the read pointer will eventually indicate a word location near that of the write pointer. In this event, most of the valid words in the FIFO have been read and, thus, the FIFO is said to be near empty, that is, it contains few remaining valid and unread words. Conversely, if numerous write operations occur with corresponding advancement of the write pointer, while the read pointer does not advance or does not advance at approximately the same rate, then the write pointer will eventually indicate a word location near that of the read pointer. In this event, most of the word storage locations in the FIFO have been written and not read and, thus, the FIFO is said to be near full. In the prior art, circuits are often included to detect either or both of these two extremes because each may warrant a system response. For example, a response to either a near-empty or near-full FIFO may be to ready the system for possible invalid data or to control the data flow to alleviate the extreme. Also included in the prior art is the ability to detect the middle state between these two extremes, that is, when the FIFO is half full of valid and unread words.

In an effort to respond to the level of fullness of a FIFO, whether that level detection may relate to near-empty, near-full, or half-full, the prior art has developed various systems based on the read and write pointers. In these systems, the prior art pointers are typically multiple-bit digital values that numerically identify each word storage location. For example, for an instance of a FIFO with locations 0 through $Z=2^N-1$, then both the read pointer and the write pointer consist of incrementing modulo counters with N bits that increment through the values of 0 through $2^N-1$ and then start once more at 0 (or vice versa for decrementing counters). Often each such counter is referred to as a pointer vector in that each such vector has multiple bits, where at least one of those multiple bits, by definition, is a different value for each of the $2^N$ different addresses of the FIFO. Given this implementation of pointers, the prior art manner of detecting fullness typically compares the two pointers, where fullness may be detected if the pointers have counter values within a certain difference of one another. Thus, this difference may be evaluated using arithmetic computations such as through use of a comparator or subtracting unit, by ways of example. However, the present inventors have observed that in certain FIFOs, and particularly in asynchronous FIFOs, these techniques may become quite extensive. Specifically, in asynchronous FIFOs, a read may occur according to one timing domain that is independent of when a write may occur, that is, the read and write operations, and pointers, are asynchronous with respect to one another. As a result, as a necessary element of the pointer evaluation technique described above, the prior art also involves a complex manner of taking the value of one pointer into the clock domain of the other pointer so as to provide an accurate comparison of the two to avoid metastability problems. In other words, without such an action, there is a possibility that at the time a first pointer (e.g., read) is copied so as to be evaluated relative to a second pointer (e.g., write), the first pointer may be in the process of changing; further, since each pointer address is represented by a vector, and if that vector is changing at the time it is copied, then some bits in the vector may contain the value before the change while others contain the new value. In this case, the captured vector value would not just be either the previous value or the new value but some totally unknown address instead. Thus, the prior art includes additional circuitry for attempting to accommodate this necessary crossing over of one pointer into the other pointer's time domain. This additional circuitry adds complexity, which consequently increases device size, cost, and power consumption, all of which are undesirable in circuit design, particularly in today's competitive marketplace.

In view of the above, the preferred embodiments as set forth below seek to improve upon the prior art as well as its associated drawbacks.

BRIEF SUMMARY OF THE INVENTION

In the preferred embodiment, there is an electronic device. The device comprises a memory structure comprising an integer M of word storage locations. The device further comprises a write shift register for storing a sequence of bits. The sequence in the write shift register comprises a number of bits equal to a ratio of $1/R_1$ times the integer M. The device further comprises circuitry for providing a write clock cycle to the write shift register for selected write operations with respect to any of the word storage locations. In response to each write clock cycle, received from the circuitry for providing the write clock cycle, the write shift register shifts the sequence in the write shift register. Further, one bit in the sequence in the write shift register corresponds to an indication of one of the memory word storage locations into which a word will be written. The device further comprises a read shift register for storing a sequence of bits. The sequence in the read shift register comprises a number of bits equal to a ratio of $1/R_2$ times the integer M. The device further comprises circuitry for providing a read clock cycle to the read shift register for selected read operations with respect to any of the word storage locations. In response to each read clock cycle, received from the circuitry for providing the read clock cycle, the read shift register shifts the sequence in the read shift register. Further, one bit in the sequence in the read shift register corresponds to an indication of one of the memory word storage locations from which a word will be read. Lastly, the device comprises circuitry for evaluating selected bits in the sequence in the write register relative to selected bits in the sequence in the read register for detecting a level of data fullness in the memory structure.

Other aspects are also disclosed and claimed.

DETAILED DESCRIPTION OF THE INVENTION

Figure 1A:
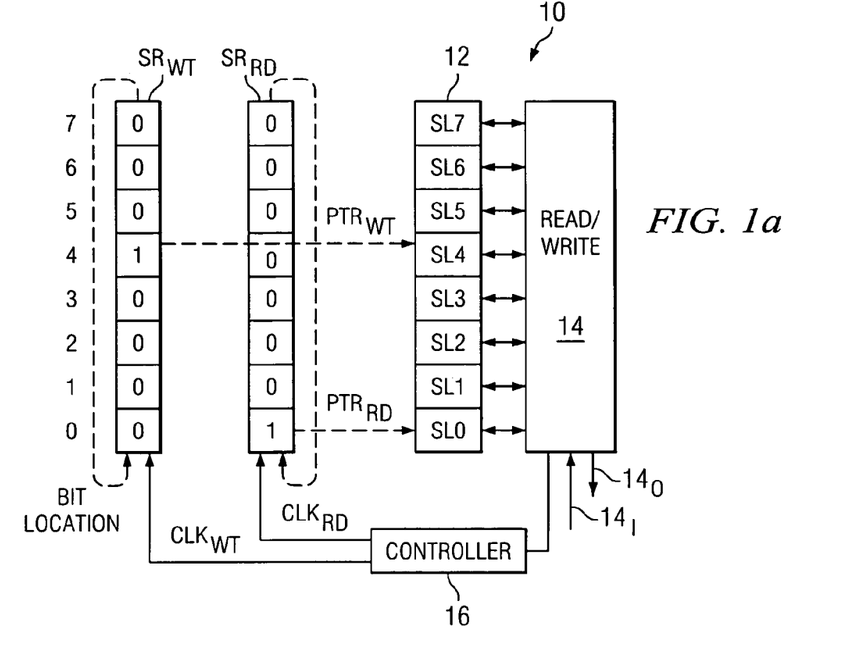
FIG. 1a illustrates a block diagram of a portion of the data storage system according to the preferred embodiments.

FIG. 1a illustrates a block diagram of a data storage system designated generally at 10 according to the preferred embodiments, where certain preferred aspects of system 10 are not shown but are added in later figures so as to simplify the present discussion. In one preferred embodiment, system 10 is constructed using a single integrated circuit. Additional circuitry may be included within such an integrated circuit such as circuitry that uses the data stored in system 10. However, to simplify the present illustration and discussion, such additional circuitry is neither shown nor described. Moreover, system 10 may be implemented in connection with numerous digital data systems, where one skilled in the art may ascertain such systems.

Looking to the blocks in system 10, system 10 includes various items which in general are known in the prior art, but additional fullness-detection aspects as well as related control and operation distinguishes the overall system as detailed later. Looking by way of introduction to some of the blocks that are comparable to the prior art, they include a first-in first-out ("FIFO") memory 12 having a number M of word storage locations; by way of example, M=8 such storage locations are shown and designated SL0 through SL7 and, thus, M also may be represented as $2^N=2^3=M$. However, the choice of N=3 and M=8 is only by way of illustration and one skilled in the art will recognize that the inventive teachings of this document may be implemented in different sized FIFO devices. In the preferred embodiment, each storage location SLx has a same B-bit dimension, where that dimension may be any size. Also included in system 10 are a write pointer $PTR_{WT}$ and a read pointer $PTR_{RD}$. Write pointer $PTR_{WT}$ indicates the word storage location of FIFO memory 12 into which a next word will be written. Read pointer $PTR_{RD}$ indicates the word storage location of FIFO memory 12 from which a next word will be read. As detailed below, however, the advancement of each such pointer is either indicated or tracked in a novel manner consistent with the preferred embodiments. System 10 also includes a data read/write circuit 14 that is bi-directionally connected to each word storage location in FIFO memory 12. Thus, data to be written to FIFO memory 12 is provided to an input $14_I$ of data read/write circuit 14 and is written to the storage location indicated by write pointer $PTR_{WT}$, and data when read out of FIFO memory 12 from a location indicated by read pointer $PTR_{RD}$ is provided at output $14_O$ of data read/write circuit 14. Data read/write circuit 14 may be constructed in various manners.

Turning now to aspects of system 10 as part of the overall inventive structure, system 10 includes a controller 16 coupled to data read/write circuit 14. In addition, controller 16 provides a write clock signal $CLK_{WT}$ to a write shift register $SR_{WT}$ and a read clock signal $CLK_{RD}$ to a read shift register $SR_{RD}$. In the preferred embodiment, each shift register $SR_{WT}$ and $SR_{RD}$ is M bits in length, that is, it is the same number in bits as the number of word storage locations in FIFO memory 12. Preferably, each shift register $SR_{WT}$ and $SR_{RD}$ also is a wraparound device, that is, in response to a respective clock signal each register shifts each bit of its contents one location toward its most significant bit ("MSB") and the bit stored at its MSB location wraps around to the least significant bit ("LSB") location as is known in the shift register art. This wraparound functionality of each shift register is shown in FIG. 1a by way of respective dotted arrows from the MSB to the LSB of each shift register. Lastly, note that for sake of convention, the bit locations are shown in FIG. 1a to the left of the Figure, and those locations also will be referenced in this document as $SR_{WT}$[x] and $SR_{RD}$[x], where the value x may be any of the bit locations. For example, the LSB of each shift register is $SR_{WT}$[0] and $SR_{RD}$[0], the next most significant bit location above that LSB is $SR_{WT}$[1] and $SR_{RD}$[1], and so forth.

As further explored below, in one preferred embodiment, at least one bit in each shift register $SR_{WT}$ and $SR_{RD}$ is loaded with one binary value of one, while the majority of the remaining bits of the shift register are loaded with a binary value of zero. In operation, the particular binary value of a one in this regard corresponds to the pointer for the respective shift register. Looking at this aspect with respect to write shift register $SR_{WT}$, the sole binary value of one in it corresponds to the location of write pointer $PTR_{WT}$. In the example of FIG. 1a, therefore, the sole binary value of one in write shift register $SR_{WT}$ is located at its bit location $SR_{WT}$[4], and this value corresponds to the location of write pointer $PTR_{WT}$ which identifies word storage location SL4 in FIFO memory 12. This relationship is further indicated in FIG. 1a by a dashed arrow, labeled $PTR_{WT}$, from the binary one in write shift register $SR_{WT}$ as a pointer to the corresponding word storage location in FIFO memory 12. Note, therefore, that write shift register $SR_{WT}$ corresponds to write pointer $PTR_{WT}$ in that it may be used to directly provide write pointer $PTR_{WT}$, or in an alternative embodiment that pointer may be provided by a separate circuit, including a counter, whereby at the same time that the separate circuit is advanced by write clock $CLK_{WT}$, so is the shifted value in write shift register $SR_{WT}$, so that in all instances the location of the binary one in write shift register $SR_{WT}$ tracks and corresponds to the then-indicated word storage location in FIFO memory 12 by write pointer $PTR_{WT}$. Looking at the same binary loading aspect described above but now in connection with read shift register $SR_{RD}$, the sole binary value of one in it corresponds to the location of read pointer $PTR_{RD}$. In the example of FIG. 1a, therefore, the sole binary value of one in read shift register $SR_{RD}$ is located at its bit location of $SR_{RD}$[0], and this value corresponds to the location of read pointer $PTR_{RD}$ which identifies word storage location SL0 in FIFO memory 12. This relationship is further indicated in FIG. 1a by a dashed arrow, labeled $PTR_{RD}$, from the binary one in read shift register $SR_{RD}$ as a pointer to the corresponding word storage location in FIFO memory 12. Thus, read shift register $SR_{RD}$ corresponds to read pointer $PTR_{RD}$ in that it may be used to directly provide read pointer $PTR_{RD}$, or in an alternative embodiment that pointer may be provided by a separate circuit, including a counter, whereby at the same time that the separate circuit is advanced by read clock $CLK_{RD}$, so is the shifted value in read shift register $SR_{RD}$, so that in all instances the location of the binary one in read shift register $SR_{RD}$ tracks and corresponds to the then-indicated word storage location in FIFO memory 12 by read pointer $PTR_{RD}$. These aspects are further explored in the remainder of this document.

Figure 1B:
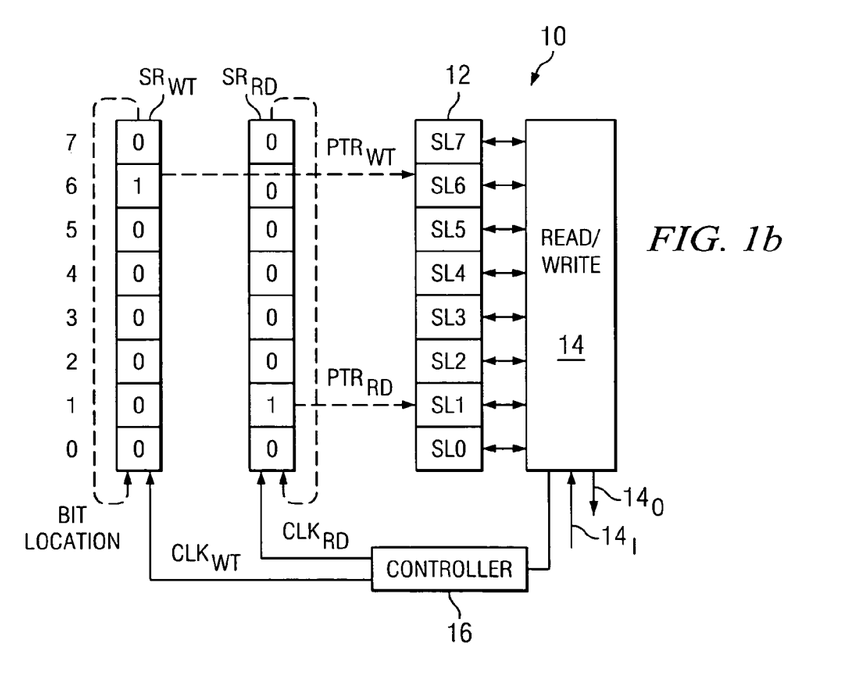
FIG. 1b illustrates the block diagram of FIG. 1a with an example of the advancement of the shift register bits and corresponding FIFO read and write pointers.

FIG. 1b illustrates the block diagram of FIG. 1a with an example of the advancement of the shift register bits and corresponding FIFO read and write pointers. Specifically, FIG. 1b illustrates system 10 following two cycles of write clock $CLK_{WT}$ and one cycle of read clock $CLK_{RD}$, which is a possible scenario given the asynchronous nature of these two clocks with respect to one another. With reference to the two cycles of write clock $CLK_{WT}$, each period of write clock $CLK_{WT}$ is provided by controller 16 to write shift register $SR_{WT}$. In response to each period, write shift register $SR_{WT}$ shifts each bit it stores one location toward its MSB, with a wraparound of the bit from its MSB to its LSB. Accordingly, the binary value of one shown in bit location $SR_{WT}$[4] of FIG. 1a is shifted, in response to the two clock cycles of write clock $CLK_{WT}$, to location $SR_{WT}$[6] in FIG. 1b. Further, because write pointer $PTR_{WT}$ is either directly provided, or tracked, by write shift register $SR_{WT}$, then FIG. 1b also illustrates the advancement of write pointer $PTR_{WT}$ to storage location SL6 in FIG. 1b. With reference to the one cycle of read clock $CLK_{RD}$, the period of read clock $CLK_{RD}$ is provided by controller 16 to read shift register $SR_{RD}$. In response, read shift register $SR_{RD}$ shifts each bit it stores one location toward its MSB, with a wraparound of the bit from its MSB to its LSB. Accordingly, the binary value of one shown in location $SR_{RD}$[0] of FIG. 1a is shifted, in response to the one clock cycle of read clock $CLK_{RD}$, to location $SR_{RD}$[1] in FIG. 1b. Further, because read pointer $PTR_{RD}$ is either directly provided, or tracked, by read shift register $SR_{RD}$, then FIG. 1b also illustrates the advancement of read pointer $PTR_{RD}$ to storage location SL1 in FIG. 1b.

From the example of FIG. 1b, one skilled in the art should appreciate the general nature of the advancement of shift register values and the corresponding advancement of pointers in system 10, with the remaining discussion pertaining to additional aspects directed to fullness detection in FIFO memory 12. However, before proceeding, note that the one-to-one correspondence of M bit locations in each shift register with the M word storage locations in FIFO memory 12 is only one preferred embodiment. In an alternative embodiment, each shift register may have a number of bit locations equal to a ratio 1/R of the M word storage slots in FIFO memory 12, where the value R could differ for each shift register. As an example with R equal to the same value for each shift register, and for R=2, FIFO memory 12 may have M=64 word storage locations while each shift register (or one such register) has 1/R*M=1/2*64=32 bit locations (i.e., in this case, the ratio is 1/2). In any event, then the shift register shifts its binary sequence once every R times its corresponding pointer is advanced with respect to FIFO memory 12, where in the present example R=2 and, thus, the shift register shifts for every R=2 times the corresponding pointer is advanced. Note also that the example of FIG. 1b, therefore, merely represents the instance where R=1, so both shift registers have 1/R=1*M bit locations, and each shift register shifts its binary sequence every time its corresponding pointer is advanced with respect to FIFO memory 12 because R=1. These aspects will be further appreciated by one skilled in the art given the remaining discussion of this document, as well as the implications of how it might slightly affect the timing of a fullness detection. For sake of simplifying the discussion, however, the remaining illustrations are directed to the instance where each shift register has a number of M bit locations and, thus, each such register shifts its binary pattern once for each advancement of its corresponding FIFO pointer.

The example of pointer position in FIG. 1b, in combination with the example of pointer position in FIG. 1a, further demonstrates an aspect with respect to the preferred resetting of FIFO memory 12. Particularly, the pointer position in FIG. 1a depicts a preferable spacing of write pointer $PTR_{WT}$ and read pointer $PTR_{RD}$ upon reset, which may occur at start-up or as a response following a level of FIFO fullness, which is detected according to the preferred embodiments as detailed later. Alternatively, the preferable spacing of write pointer $PTR_{WT}$ and read pointer $PTR_{RD}$ upon reset may occur after a pointer collision, where such a collision may be detected in various forms, including also by monitoring shift registers $SR_{WT}$ and $SR_{RD}$, as further borne out in U.S. patent application Ser. No. 10/726,887, entitled "First-In First-Out Memory System With A Single Bit Indication Of An Addressed Word Location" (TI-36900), filed on the same date as the present application, and hereby incorporated herein by reference. In any event, in the preferred embodiment, for a FIFO having M word storage locations, then upon reset, read pointer $PTR_{RD}$ and write pointer $PTR_{WT}$ are spaced apart a distance of M/2 storage locations, as may be achieved through control of controller 16. Thus, the reset sequence of bits in read shift register $SR_{RD}$ is offset from the reset sequence of bits in write shift register $SR_{WT}$ by a distance of M/2. This separation, along with the expectation that over time the frequency of each pointer clock is approximately the same as the other pointer clock, reduces the chance that either pointer will advance to encroach upon or collide with the other. With this knowledge of the preferred reset positioning, one skilled in the art may ascertain various fashions to ensure that the first four reads are indicated as invalid. However, once read pointer reaches $PTR_{RD}$ reaches storage location SL4 in a first instance following a reset, and as shown in FIG. 1a, and assuming that no reset from a collision then occurs with write pointer $PTR_{WT}$, that is, assuming write pointer $PTR_{WT}$ has advanced such as also shown by way of example in FIG. 1b, then the next read will be of valid data. Once more, one skilled in the art may ascertain various fashions to ensure that such reads are indicated as valid.

Figure 2:
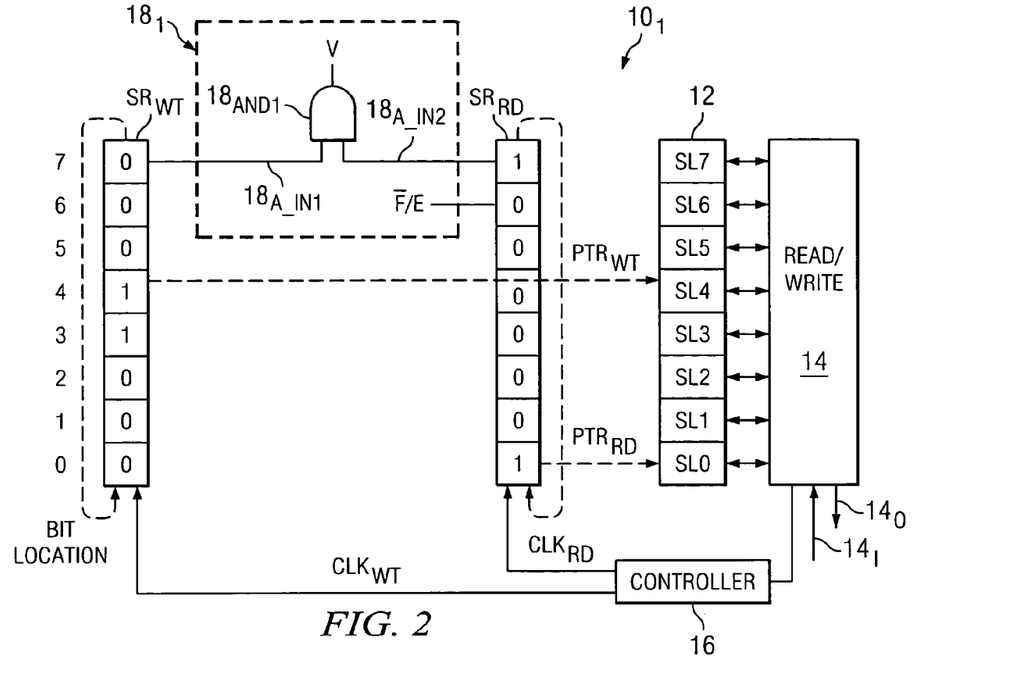
FIG. 2 illustrates the block diagram of FIG. 1a with additional aspects directed to detecting fullness, either in the form of near-full or near-empty status, in the system FIFO.

FIG. 2 illustrates system 10 of FIG. 1a (and 1b) with additional aspects directed to detecting valid data fullness, either in the form of near-full or near-empty status, in FIFO memory 12. For sake of distinction, the system shown in FIG. 2 is referred to as system $10_1$. System $10_1$ includes the same components of system 10 from FIG. 1a, where for sake of convenience and understanding the reference numbers for these same items are carried forward from FIG. 1a into FIG. 2. Thus, the reader is referred to the previous discussion for details on such aspects. Looking then to the additional aspects of system $10_1$ over system 10, system $10_1$ includes a FIFO fullness detecting circuit $18_1$. In the preferred embodiment, FIFO fullness detecting circuit $18_1$ consists of circuitry that performs its analysis through only a single stage of logic, that is, selected bits are connected to logic where the serial path through that logic only passes through a single gate to provide an indication of FIFO fullness. More particularly, in the illustrated and preferred embodiment, the single stage consists of one logic gate, namely, an AND gate $18_{AND1}$, with inputs $18_{A\_IN1}$ and $18_{A\_IN2}$ connected to like-positioned bit locations in write and read shift registers $SR_{WT}$ and $SR_{RD}$, respectively. Specifically, a first input $18_{A\_IN1}$ is connected to bit location $SR_{WT}[7]$ and a second input $18_{A\_IN2}$ is connected to bit location $SR_{RD}[7]$. The output of AND gate $18_{AND1}$ provides a valid signal, designated as V. The valid signal, V, corresponds to a second signal of FIFO fullness detecting circuit $18_1$, where that signal is shown in FIG. 2 as $\overline{F}/E$ and is provided by the state of bit location $SR_{RD}[6]$, that is, the location that immediately follows the location that is connected to input $18_{A\_IN2}$ of AND gate $18_{AND1}$. Thus, when the valid signal, V, is asserted high, then for sake of the indication of fullness detection, the $\overline{F}/E$ signal is considered valid. Moreover, and as demonstrated later, when valid the $\overline{F}/E$ signal indicates that FIFO memory 12 is approaching either a near-full or near-empty status. Specifically, an output of $\overline{F}/E=0$, when valid, indicates that FIFO memory 12 is near full, and an output of $\overline{F}/E=1$, when valid, indicates that FIFO memory 12 is near empty.

The binary states stored in write shift register $SR_{WT}$ and read shift register $SR_{RD}$ of FIG. 2 differ slightly from those shown in FIG. 1a. Specifically, recall that earlier it is stated that each shift register, under the preferred embodiment, stores at least one binary value of one. In the example of FIG. 2, two such binary values of one are stored in each shift register, with the leading bit position, as considered in terms of the direction of shifting for each register, being the bit that corresponds to the pointer for that shift register. Thus, with respect to write shift register $SR_{WT}$, the binary value of one in its leading bit location, namely, $SR_{WT}[4]$, corresponds to write pointer $PTR_{WT}$. With respect to read shift register $SR_{RD}$, it has a binary value of one in locations $SR_{RD}[0]$ and $SR_{RD}[7]$; however, recall that it shifts bits from its MSB to its LSB and, thus, in terms of this rotational shifting, the bit at location $SR_{RD}[0]$ leads the one behind it at $SR_{RD}[7]$ and, thus, the binary value of one at bit location $SR_{RD}[0]$ corresponds to read pointer $PTR_{RD}$. The effect of the trailing binary one in each of shift registers $SR_{WT}$ and $SR_{RD}$, as shown in bit locations $SR_{WT}[3]$ and $SR_{RD}[7]$ in FIG. 2, is further appreciated from the remaining discussion in this document.

Figure 3:
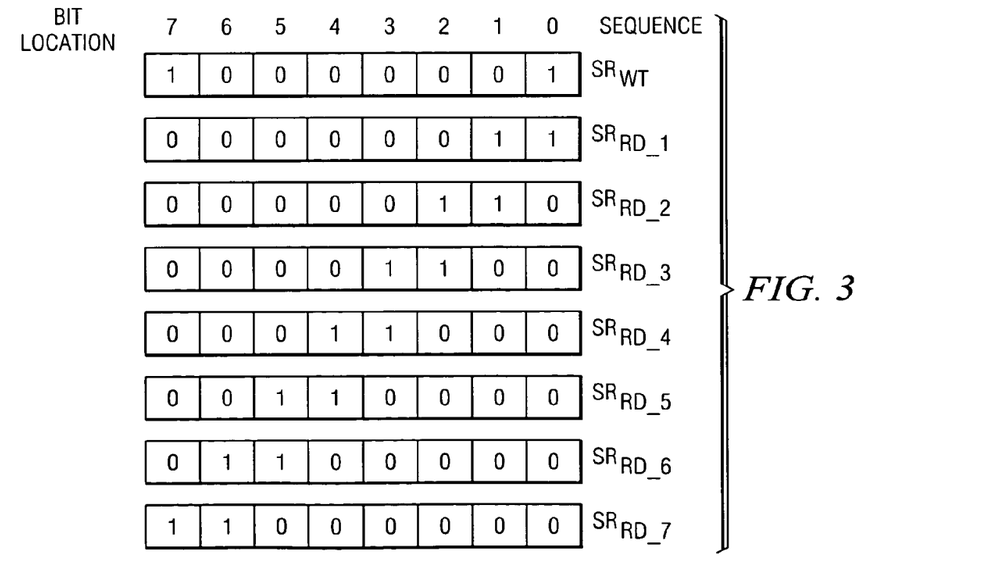
FIG. 3 illustrates sequential operations of the preferred embodiment of FIG. 2 where the read shift register $SR_{RD}$ advances toward the write shift register $SR_{WT}$ as the FIFO approaches an empty state.

FIG. 3 illustrates sequential operations of the preferred embodiment of system $10_1$ of FIG. 2 where read shift register $SR_{RD}$ advances toward write shift register $SR_{WT}$ as FIFO memory 12 approaches an empty state. For sake of simplifying the drawing, the only structures shown in FIG. 3 are shift registers $SR_{WT}$ and $SR_{RD}$, and they are shown horizontally for sake of illustrating a time sequence downward along the Figure. Particularly, in the example of FIG. 3, write shift register $SR_{WT}$ is shown to maintain a single state of binary values designated $SR_{WT}$, where that state includes a leading binary value of one in location $SR_{WT}[0]$, followed in shifting time by a binary one in location $SR_{WT}[7]$. In contrast, read shift register $SR_{RD}$ is shown to sequence through seven different states, which commence with a binary state shown as $SR_{RD\_1}$ and which is followed by six additional cycles of read clock $CLK_{RD}$. In binary state $SR_{RD\_1}$, the leading binary one stored in read shift register $SR_{RD}$ is in location $SR_{RD}[1]$ followed by a single trailing binary value of one stored in location $SR_{RD}[0]$. Thus, for each successive cycle of $CLK_{RD}$, these two binary ones advance one position toward the MSB, which in FIG. 3 is to the left. Further, because the leading binary value of one in read shift register $SR_{RD}$ corresponds to read pointer $PTR_{RD}$, then one skilled in the art should appreciate that FIG. 3 demonstrates the advancement of read pointer $PTR_{RD}$ toward write pointer $PTR_{WT}$, which corresponds to an example of the emptying of the valid data of FIFO memory 12 as each read occurs. Moreover, when read pointer $PTR_{RD}$ gets within a certain proximity of write pointer $PTR_{WT}$, then the preferred embodiment detects this near-empty status, as further discussed below.

Looking to FIG. 3 in combination with FIG. 2, one skilled in the art will appreciate the resulting signals that are provided by FIFO fullness detecting circuit $18_1$. Specifically, for each of sequences $SR_{RD\_1}$ through $SR_{RDdi\_6}$, the valid signal V output of AND gate $18_{AND1}$ is low and, thus, this indicates that the $\overline{F}/E$ indication from bit location $SR_{RD}[6]$ is to be considered invalid. However, for sequence $SR_{RD\_7}$, the valid signal V output of AND gate $18_{AND1}$ is high and, thus, this indicates that the $\overline{F/E}$ indication from bit location $SR_{RD}[6]$ is to be considered valid. Also in sequence $SR_{RD\_7}$, the binary value at bit location $SR_{RD}[6]$ provides the $\overline{F/E}$ signal and is one, and recall from earlier that such a value is defined to indicate a near-empty status. Accordingly, system $10_1$ provides a detection of such a status through the indication of the $\overline{F/E}$ and V signals, and in response to that status various actions may be taken as may be ascertained by one skilled in the art.

Figure 4:
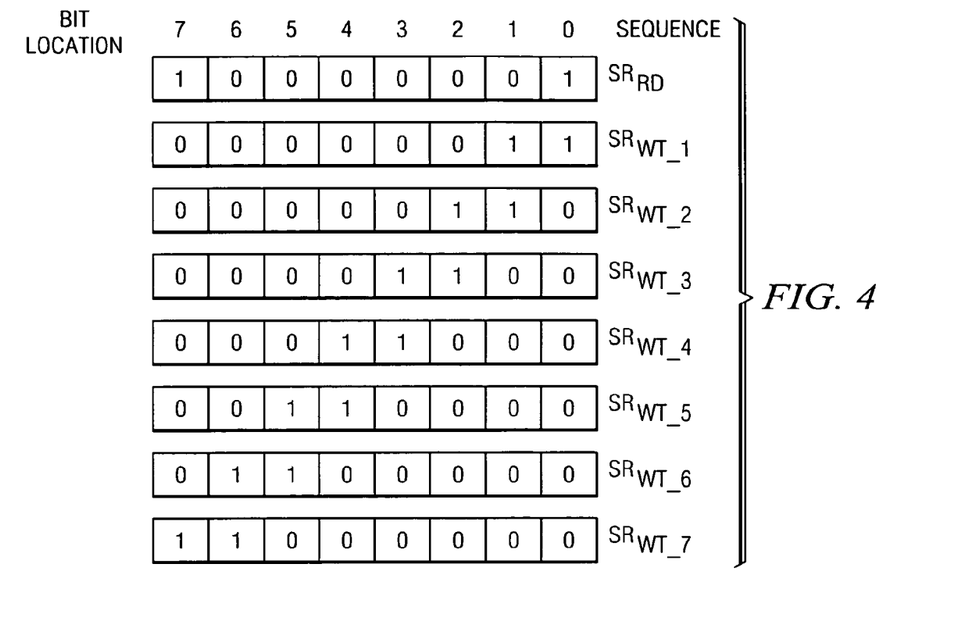
FIG. 4 illustrates sequential operations of the preferred embodiment of FIG. 2 where the write shift register $SR_{WT}$ advances toward the read shift register $SR_{RD}$ as the FIFO approaches a full state.

FIG. 4 illustrates sequential operations of the preferred embodiment of system $10_1$ of FIG. 2 where write shift register $SR_{WT}$ advances toward read shift register $SR_{RD}$ as FIFO memory 12 approaches a full state. As was the case for FIG. 3, FIG. 4 only illustrates shift registers $SR_{WT}$ and $SR_{RD}$ in a horizontal orientation and with time shifting occurring to the left. In the example of FIG. 4, read shift register $SR_{RD}$ is shown to maintain a single state of binary values designated $SR_{RD}$, where in contrast write shift register $SR_{WT}$ is shown to sequence through seven different states, which commence with a binary state shown as $SR_{WT\_1}$ that is followed by six additional cycles of write clock $CLK_{WT}$. In binary state $SR_{WT\_1}$, the leading binary one stored in write shift register $SR_{WT}$ is in location $SR_{WT}[1]$ followed by a single trailing binary value of one stored in location $SR_{WT}[0]$. Thus, for each successive cycle of write clock $CLK_{WT}$, these two binary ones advance one position toward the MSB. Further, because the leading binary value of one in write shift register $SR_{WT}$ corresponds to write pointer $PTR_{WT}$, then one skilled in the art should appreciate that FIG. 4 demonstrates the advancement of write pointer $PTR_{WT}$ towards read pointer $PTR_{RD}$, which corresponds to an example of the filling of the valid data of FIFO memory 12 as each write occurs. Moreover, when write pointer $PTR_{WT}$ gets within a certain proximity of read pointer $PTR_{RD}$, then the preferred embodiment detects this near-full status, as further discussed below.

Looking to FIG. 4 in combination with FIG. 2, one skilled in the art will appreciate the resulting signals that are provided by FIFO fullness detecting circuit $18_1$. Specifically, for each of sequences $SR_{WT\_1}$ through $SR_{WT\_6}$, the valid signal V output of AND gate $18_{AND1}$ is low and, thus, this indicates that the $\overline{F/E}$ indication from bit location $SR_{RD}[6]$ is to be considered invalid. However, for sequence $SR_{WT\_7}$, the valid signal V output of AND gate $18_{AND1}$ is high and, thus, this indicates that the $\overline{F/E}$ indication from bit location $SR_{RD}[6]$ is to be considered valid. Also in sequence $SR_{WT\_7}$, the binary value at bit location $SR_{RD}[6]$ provides the $\overline{F/E}$ signal and is zero, and recall from earlier that such a value is defined to indicate a near-full status. Accordingly, system $10_1$ provides a detection of such a status through the indication of the $\overline{F/E}$ and V signals, and again various actions may be taken as may be ascertained by one skilled in the art.

The preceding demonstrates a preferred embodiment that operates to detect a near-full or near-empty status of a FIFO system. Note that the preferred embodiment achieves its result with a key benefit over the prior art. Specifically, the use of read and write shift registers, advanced by respective read and write clock cycles, permits an instantaneous analysis of bits as they exist at a same time in both registers. As such, there is no need to capture a multiple-bit pointer vector in one clock domain and to take that vector into the clock domain of the other pointer. Further, the detection of a preferred embodiment may be implemented in a single logic stage, that is, the signal analysis passes serially through only a single logic gate, which in the example of FIG. 2 is a single AND gate, while additional embodiments below show additional gates, but those gates operate in parallel and without feedback so there is no or minimal additional delay or instability which might give rise to delay in the resulting indication of FIFO status. In either case, therefore, the FIFO fullness detection may be achieved with considerably less complexity as compared to the prior art, thereby reducing device size and cost. As another benefit of the preferred embodiment, it may be modified to provide additional embodiments, where certain examples of such embodiments are shown below. As still another benefit, given the asynchronous nature of read clock $CLK_{RD}$ and write clock $CLK_{WT}$, the overlap between two binary ones in the respective shift registers may be for a short period of time, where that shortness in the prior art of an overlap of vector pointers required considerable complexity to accurately detect. In contrast, all that is required in the preferred embodiment is the triggering of a logic gate. Note also in this regard and for purposes of additional response to the detected collision, the high output of the detecting AND gate may be connected to additional circuitry (not shown) that may be included in detecting circuit $18_1$. For example, the output of the detecting AND gate may be connected as a clear input to two cascaded flip flops, in which case a FIFO fullness indication, even if detected by the AND gate for a very short period of time, is then effectively extended in time as it is clocked through the cascaded flip flops. With this extended asserted signal, FIFO memory 12 may be reset in response to the detected status, such as by again positioning the binary sequences in the shift registers in the positions indicated in FIG. 1a and also marking the data in FIFO memory 12 invalid. Still other synchronization techniques in response to the detected collision may be ascertained by one skilled in the art.

Figure 5:
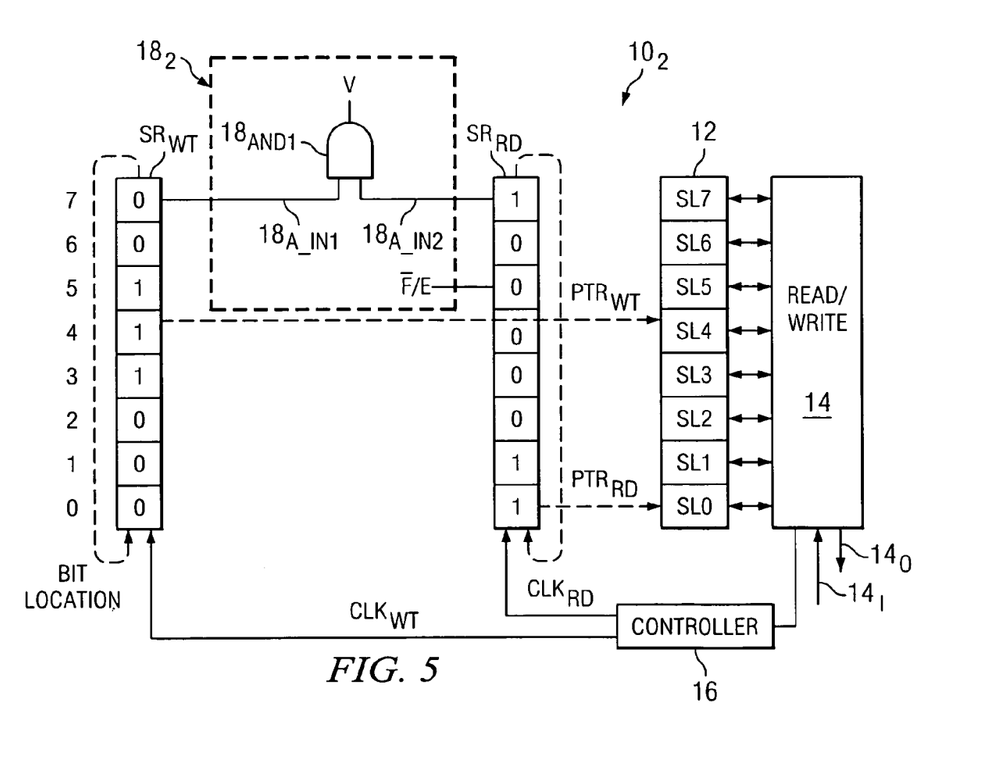
FIG. 5 illustrates the block diagram of FIG. 1a with additional aspects directed to detecting fullness in the system FIFO, as an alternative to the system of FIG. 2.

FIG. 5 illustrates a system $10_2$ as an alternative to system $10_1$ of FIG. 2, where system $10_2$ shares various aspects of system $10_1$ and the reference numbers for such aspects are carried forward from FIG. 2 into FIG. 5 and the reader is assumed familiar with the earlier discussion of such items. Looking then to the differences in system $10_2$ as compared to system $10_1$, system $10_2$ includes a FIFO fullness detecting circuit $18_2$. In the preferred embodiment, FIFO fullness detecting circuit $18_2$ includes the same two-input AND gate $18_{AND1}$ having an input connected to bit locations $SR_{WT}[7]$ and $SR_{RD}[7]$ and providing an output valid signal, V. However, two distinctions are shown in system $10_2$ as compared to system $10_1$. First, an $\overline{F/E}$ signal is again provided, but in system $10_2$ it is provided by the state of bit location $SR_{RD}[5]$, that is, the location that follows two bits following the location that is connected to input $18_{A\_IN2}$ of AND gate $18_{AND1}$. Here again, when the valid signal, V, is asserted high, then $\overline{F/E}$ signal is considered valid, and the $\overline{F/E}$ signal indicates that FIFO memory 12 is approaching either a near-full status if $\overline{F/E}=0$ or a near-empty status if $\overline{F/E}=1$. As an additional difference between systems $10_2$ and $10_1$, each shift register in system $10_2$ is loaded with a sequence that includes three contiguous binary ones, as opposed to two contiguous binary ones in system $10_1$. In addition, in the illustrated example of system $10_2$, the middle binary one for each shift register corresponds to the pointer. Thus, with respect to write shift register $SR_{WT}$, its middle binary one is at location $SR_{WT}[4]$ and it corresponds to write pointer $PTR_{WT}$, and with respect to read shift register $SR_{RD}$, its middle binary one is at location $SR_{RD}[0]$ and it corresponds to read pointer $PTR_{RD}$.

Figure 6:
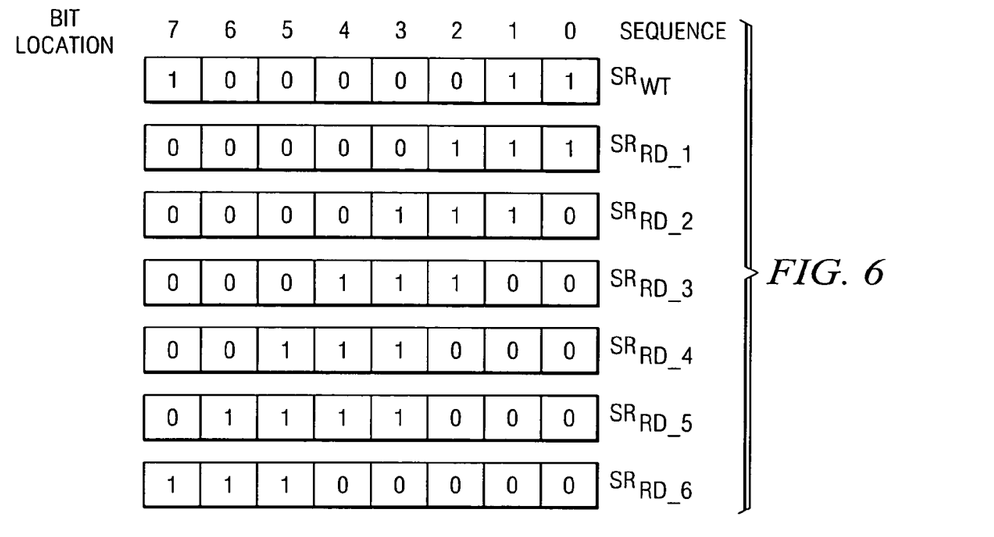
FIG. 6 illustrates sequential operations of the alternative preferred embodiment of FIG. 5 where the read shift register $SR_{RD}$ advances toward the write shift register $SR_{WT}$ as the FIFO approaches an empty state.

FIG. 6 illustrates sequential operations of the preferred embodiment of system $10_2$ of FIG. 5 where read shift register $SR_{RD}$ advances toward write shift register $SR_{WT}$ as FIFO memory 12 approaches an empty state, where again to simplify the drawing FIG. 6 illustrates only shift registers $SR_{WT}$ and $SR_{RD}$. Also in the example of FIG. 6, write shift register $SR_{WT}$ is shown to maintain a single state of binary values designated as $SR_{WT}$, where that state includes a leading binary value of one in location $SR_{WT}[1]$, followed in shifting time by two binary ones, one at location $SR_{WT}[0]$ and corresponding to write pointer $PTR_{WT}$ and another at location $SR_{WT}[7]$. In contrast, read shift register $SR_{RD}$ is shown to sequence through six different states, $SR_{RD\_1}$ through $SR_{RD\_6}$, each responsive to a cycle of read clock $CLK_{RD}$. In binary state $SR_{RD\_1}$, the leading binary one stored in read shift register $SR_{RD}$ is in location $SR_{RD}[2]$ followed by two trailing binary value of ones, the first stored in location $SR_{RD}[1]$ and corresponding to read pointer $PTR_{RD}$ and the second stored in location $SR_{RD}[0]$. Thus, for each successive cycle of read clock $CLK_{RD}$, these three binary ones advance one position toward the MSB, which consistent with the remaining convention in this document is to the left. As with earlier examples, because the middle binary value of one in read shift register $SR_{RD}$ corresponds to read pointer $PTR_{RD}$, FIG. 6 demonstrates the advancement of read pointer $PTR_{RD}$ toward write pointer $PTR_{WT}$ and, hence, toward a near-empty state of FIFO memory 12.

Looking to FIG. 6 in combination with FIG. 5, one skilled in the art will appreciate the resulting signals that are provided by FIFO fullness detecting circuit $18_2$. Specifically, for each of sequences $SR_{RD\_1}$ through $SR_{RD\_5}$, the V output of AND gate $18_{AND1}$ is low and, thus, this indicates that the $\overline{F}/E$ signal output by bit $SR_{RD}[5]$ is to be considered invalid. However, for sequence $SR_{RD\_6}$, the V output of AND gate $18_{AND1}$ is high and, thus, this indicates that the $\overline{F}/E$ signal output from bit $SR_{RD}[5]$ is to be considered valid. Further in this regard, in sequence $SR_{RD\_6}$, the binary value at bit location $SR_{RD}[5]$ is one, thereby producing an $\overline{F}/E$ signal equal to one. Further, recall from earlier that a high $\overline{F}/E$ output is defined to indicate a near-empty status. Accordingly, system $10_2$ provides a detection of such a status through the indication of the $\overline{F}/E$ and V signals, and in response to that status various actions may be taken as may be ascertained by one skilled in the art.

Before proceeding, a few additional observations are noteworthy with respect to system $10_2$ of FIG. 5 as compared to system $10_1$ of FIG. 2. System $10_1$, using only two binary ones in each shift register sequence and tapping the $\overline{F}/E$ signal from $SR_{RD}[6]$ represents an implementation that may assume certain ideal conditions. In many circuits, however, there will be delays in the circuit operation. These delays may be more properly accounted for using system $10_2$. For example, consider the transition between case 1 and case 2, shown in the following Table 1:

TABLE 1

| 7 | 6 | 5 | 4 | 3 | 2 | 1 | 0 | Bit location | Case |
|---|---|---|---|---|---|---|---|---|---|
| 1 | 1 | 0 | 0 | 0 | 0 | 0 | 0 | $SR_{RD}$ | Case 1 |
| 0 | 1 | 1 | 0 | 0 | 0 | 0 | 0 | $SR_{WT}$ | Case 1 |
| 1 | 0 | 0 | 0 | 0 | 0 | 0 | 1 | $SR_{RD}$ | Case 2 |
| 1 | 1 | 0 | 0 | 0 | 0 | 0 | 0 | $SR_{WT}$ | Case 2 |

In Case 1, and according to system $10_1$, the output of AND gate $18_{AND1}$ is low due to its low input from location $SR_{WT}[7]$ and, hence, the bit at location $SR_{RD}[6]$ is considered invalid. However, assume at or near the same time, both shift registers advance from Case 1 to Case 2. In response, the output of AND gate $18_{AND1}$ will transition from low to high, while at the same time the value of $\overline{F}/E$ signal from location $SR_{RD}[6]$ will be transitioning from high to low. Thus, there may exist a small amount of time when the valid signal might be high before the $\overline{F}/E$ signal is detected as low, thereby potentially providing an erroneous indication. System $10_2$ of FIG. 5 avoids this possibility by providing three contiguous ones and an additional offset of one more bit location between the bit location 7 of the AND input and the bit location $SR_{RD}[5]$ of the $\overline{F}/E$ signal. More particularly, in this latter embodiment, the valid signal, V, will go high at least one write clock cycle after the location $SR_{RD}[5]$ bit (i.e., the $\overline{F}/E$ signal) has already transitioned low, thereby causing the $\overline{F}/E$ signal to be properly interpreted once the valid signal, V, goes high. Thus, system $10_2$ may prove more desirable in certain implementations.

Figure 7:
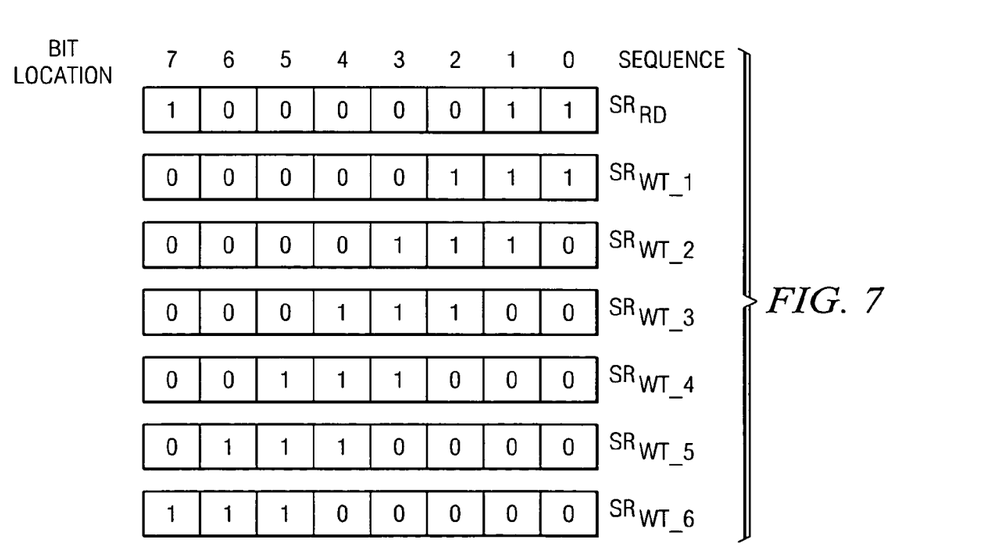
FIG. 7 illustrates sequential operations of the alternative preferred embodiment of FIG. 5 where the write shift register $SR_{WT}$ advances toward the read shift register $SR_{RD}$ as the FIFO approaches an empty state.

FIG. 7 illustrates sequential operations of the preferred embodiment of system $10_2$ of FIG. 5 where write shift register $SR_{WT}$ advances toward read shift register $SR_{RD}$ as FIFO memory 12 approaches a full state, where again as simplified the drawing depicts only shift registers $SR_{WT}$ and $SR_{RD}$. In the example of FIG. 7, read shift register $SR_{RD}$ is shown to maintain a single state of binary values designated as $SR_{RD}$, where that state includes a leading binary value of one in location $SR_{RD}[1]$, followed in shifting time by two binary ones, one at location $SR_{RD}[0]$ and corresponding to read pointer $PTR_{RD}$ and another at location $SR_{RD}[7]$. In contrast, write shift register $SR_{WT}$ is shown to sequence through six different states, $SR_{WT\_1}$ through $SR_{WT\_6}$, each responsive to a cycle of write clock $CLK_{WT}$ discussed above. In binary state $SR_{WT\_1}$, the leading binary one stored in write shift register $SR_{WT}$ is in location $SR_{WT}[2]$ followed by two time trailing binary value of ones, the first stored in location $SR_{WT}[1]$ and corresponding to write pointer $PTR_{WT}$ and the second stored in location $SR_{WT}[0]$. Thus, for each successive cycle of $CLK_{WT}$, these three binary ones advance one position toward the MSB, again shown to the left. As with earlier examples, because the middle binary value of one in write shift register $SR_{WT}$ corresponds to write pointer $PTR_{WT}$, FIG. 7 demonstrates the advancement of write pointer $PTR_{WT}$ toward read pointer $PTR_{RD}$ and, hence, toward a near-full state of FIFO memory 12.

Looking to FIG. 7 in combination with FIG. 5, the resulting signals provided by FIFO fullness detecting circuit $18_2$ are readily understood. For each of sequences $SR_{WT\_1}$ through $SR_{WT\_5}$, the V output of AND gate $18_{AND1}$ is low and, thus, this indicates that the $\overline{F}/E$ signal from location $SR_{RD}[5]$ is to be considered invalid. However, for sequence $SR_{WT\_6}$, the V output of AND gate $18_{AND}$ is high and, thus, this indicates that the $\overline{F}/E$ signal from location $SR_{RD}[5]$ is to be considered valid. Also in sequence $SR_{WT\_6}$, the binary value at bit location $SR_{RD}[5]$ (at the top of FIG. 7) is zero, thereby providing the value of $\overline{F}/E$ equal to zero. Further, recall from earlier that a low $\overline{F}/E$ output is defined to indicate a near-full status. Accordingly, system $10_2$ provides a detection of such a status through the indication of the $\overline{F}/E$ and V signals, and in response to that status various actions may be taken as may be ascertained by one skilled in the art.

Figure 8:
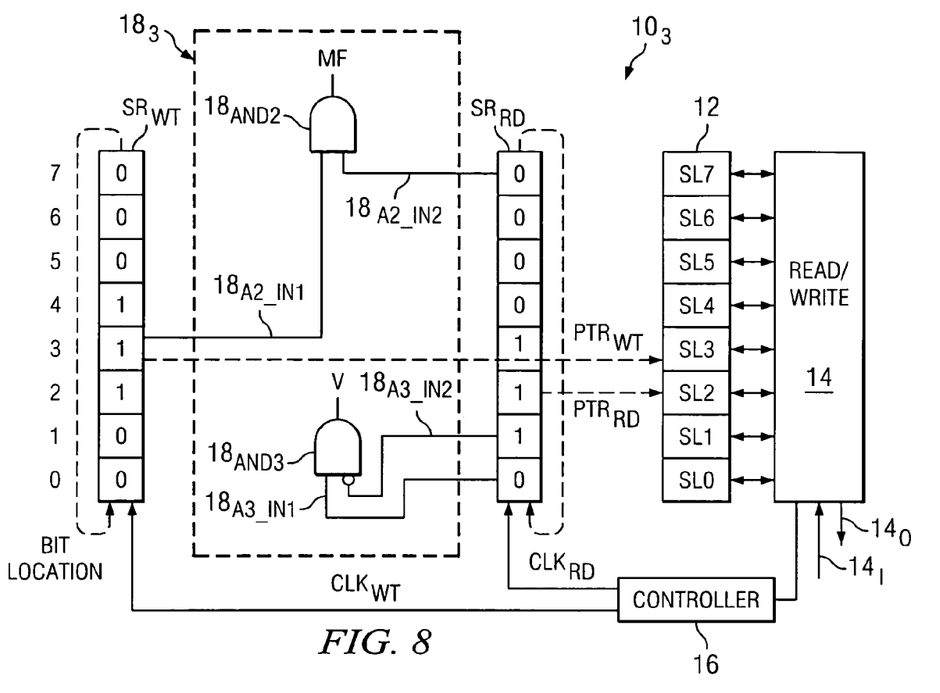
FIG. 8 illustrates the block diagram of FIG. 1a with additional aspects directed to detecting half-fullness in the system FIFO.

FIG. 8 illustrates a system $10_3$ as an alternative to system $10_2$ of FIG. 5, or which may be combined with system $10_2$ for additional fullness detection. System $10_3$ shares various aspects of system $10_2$ and again the reference numbers for such aspects are carried forward from FIG. 5 into FIG. 8. Looking then to the differences in system $10_3$ as compared to system $10_2$, system $10_3$ includes a FIFO mid-fullness detecting circuit $18_3$ which, as its name suggests, is operable to detect when FIFO memory 12 is halfway full. In the preferred embodiment, FIFO mid-fullness detecting circuit $18_3$ includes a two-input AND gate 18 having one input $18_{A2\_IN1}$ connected to bit location $SR_{WT}[3]$ and another input $18_{A2\_IN2}$ connected to bit location $SR_{RD}[7]$, where AND gate $18_{AND2}$ provides a mid-full signal, MF, at its output. In addition, mid-fullness detecting circuit $18_3$ includes an AND gate $18_{AND3}$, having an input $18_{A3\_IN1}$ connected to bit location $SR_{RD}[0]$ and an inverted input $18_{A3\_IN2}$ connected to bit location $SR_{RD}[1]$. The output of AND gate $18_{AND3}$ provides an output valid signal, V, which when asserted indicates that the MF signal output by AND gate $18_{AND2}$ is valid. Also with respect to the MF signal, when it is asserted high and is valid, it indicates that FIFO memory 12 is half full, that is, for its M word storage locations, M/2 of those locations store valid unread data. However, if MF is not valid or not asserted, then no half-full status is detected. These signals and operation are further appreciated below.

Figure 9:
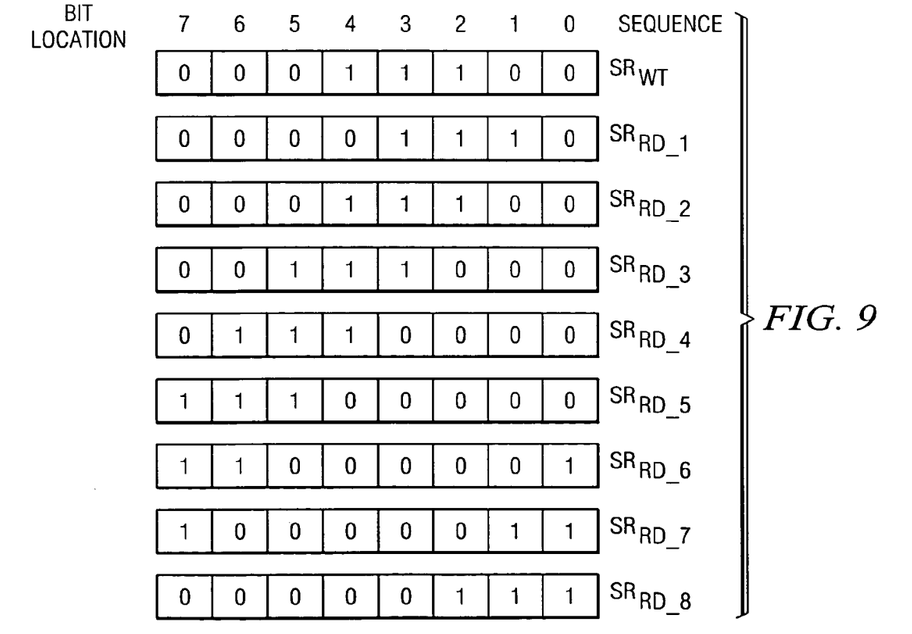
FIG. 9 illustrates sequential operations of the preferred embodiment of FIG. 8 where the read shift register $SR_{RD}$ advances relative to the write shift register $SR_{WT}$.

FIG. 9 illustrates sequential operations of the preferred embodiment of system $10_3$ of FIG. 8 where read shift register $SR_{WT}$ advances and write shift register remains in an un-shifted state, with each starting with the state also illustrated in FIG. 8. Thus, with respect to write shift register $SR_{WT}$, it has a binary value of one at its location $SR_{WT}[3]$, which corresponds to write pointer $PTR_{WT}$, and which is preceded in shifting time by a binary one at location $SR_{WT}[4]$ and is followed in shifting time by a binary one at location $SR_{WT}[2]$. Read shift register $SR_{RD}$ is shown in FIG. 9 to advance through a sequence of eight shifts $SR_{RD\_1}$ through $SR_{RD\_8}$, with each shift corresponding to a cycle of read clock $CLK_{RD}$. In sequence $SR_{RD\_1}$, read shift register $SR_{RD}$ has a binary value of one at its location $SR_{RD}[2]$, which corresponds to read pointer $PTR_{RD}$, and which is preceded in shifting time by a binary one at location $SR_{RD}[3]$ and is followed in shifting time by a binary one at location $SR_{RD}[1]$. Thus, as read shift register $SR_{RD}$ shifts its binary values, it corresponds to the advancement of read pointer $PTR_{RD}$ toward write pointer $PTR_{WT}$. As shown below, once the two pointers are M/2 word slot locations apart, thereby placing FIFO memory 12 in a mid-full state, FIFO mid-fullness detecting circuit $18_3$ detects such a status.

Looking to FIG. 9 in combination with FIG. 8, the resulting signals provided by FIFO mid-fullness detecting circuit $18_3$ are readily understood. For each of sequences $SR_{RD\_1}$ through $SR_{RD\_5}$ and $SR_{RD\_7}$ through $SR_{RD\_8}$, the V output of AND gate of AND gate $18_{AND3}$ is low and, thus, this indicates that the MF output from AND gate $18_{AND2}$ is to be considered invalid. However, for sequence $SR_{RD\_6}$, the V output of AND gate $18_{AND3}$ is high and, thus, this indicates that the MF output from AND gate $18_{AND2}$ is to be considered valid. Also in sequence $SR_{RD\_6}$, the binary values at bit locations $SR_{WT}[3]$ and $SR_{RD}[7]$ are both one, which are provided as inputs to AND gate $18_{AND2}$, thereby causing that gate to produce a high MF signal. Thus, at this point, the MF signal is valid as indicated by AND gate $18_{AND3}$, and when valid and high recall from earlier that such an indication is defined to indicate a mid-full status. Accordingly, system $10_3$ provides a detection of such a status and that indication may be used as determined by one skilled in the art.

Figure 10:
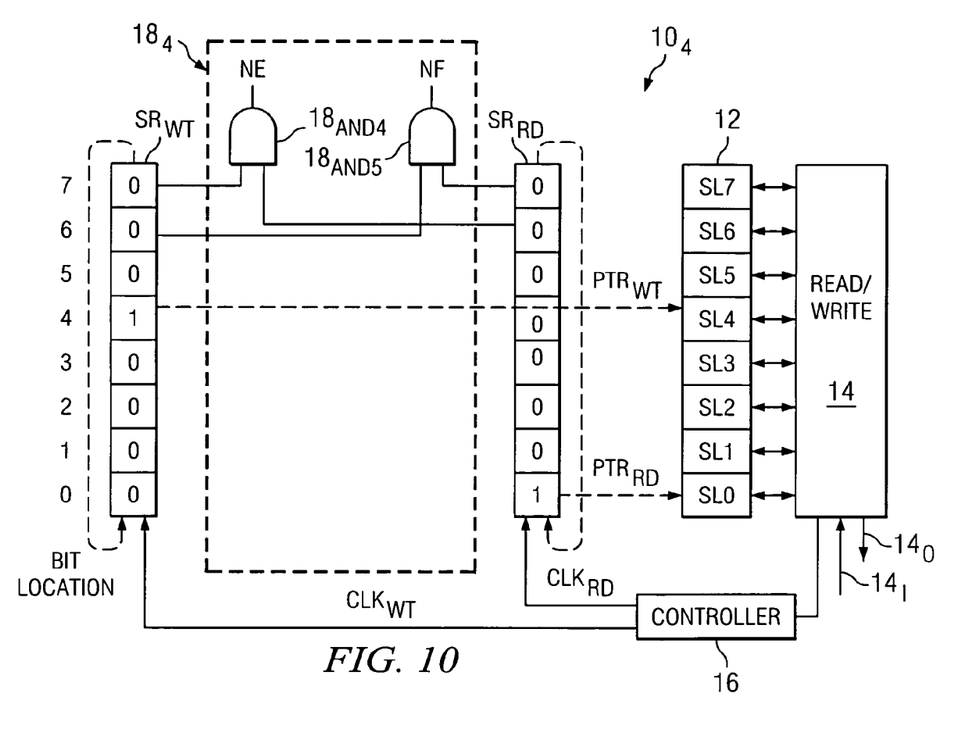
FIG. 10 illustrates the block diagram of FIG. 1a with additional aspects directed to detecting fullness in the system FIFO, as an alternative to the systems of FIGS. 2 and 5.

FIG. 10 illustrates a system $10_4$ as an alternative to system $10_1$ of FIG. 2, where once again system $10_4$ shares various aspects of system $10_1$ and the reference numbers for such aspects are carried forward from FIG. 2 into FIG. 10. Looking then to the differences in system $10_4$ as compared to system $10_1$, system $10_4$ includes a FIFO fullness detecting circuit $18_4$. In the preferred embodiment, FIFO fullness detecting circuit $18_4$ includes two AND gates. A first AND gate $18_{AND4}$ has one input connected to bit location $SR_{WT}[7]$ and another input connected to bit location $SR_{RD}[6]$. The output of AND gate $18_{AND4}$ provides an NE signal, which when asserted high indicates a near-empty status for FIFO memory 12. A second AND gate $18_{AND5}$ has one input connected to bit location $SR_{WT}[6]$ and another input connected to bit location $SR_{RD}[7]$. The output of AND gate $18_{AND5}$ provides an NF signal, which when asserted high indicates a near-full status for FIFO memory 12.

The operation of system $10_4$ of FIG. 10 is readily understood from the illustration of FIG. 10 as well as the numerous alternative embodiments described above. In general, each shift register $SR_{WT}$ and $SR_{RD}$ stores a known binary pattern. For each cycle of the appropriate one of the read or write clocks $CLK_{RD}$ and $CLK_{WT}$, the corresponding shift register advances its pattern. In the example of FIG. 10, each pattern stores only a single binary value of one, with the remaining bits storing a binary value of zero. The binary one in each shift register corresponds to the pointer for that register, that is, the binary one at location $SR_{WT}[4]$ in FIG. 10 corresponds to write pointer $PTR_{WT}$ indicating word storage location SL4, and the binary one at location $SR_{RD}[0]$ in FIG. 10 corresponds to read pointer $PTR_{RD}$ indicating word storage location SL0. In response to the advancement of each pattern as the respective shift register shifts, FIFO fullness detecting circuit $18_4$ includes sufficient circuitry to monitor the placement of one shift register's bits in time relative to the placement of the other shift register's bits in time. Thus, if over time write shift register $SR_{WT}$ advances at a greater rate than read shift register $SR_{RD}$, then the binary value of one in write shift register $SR_{WT}$ at some point will become positioned at one bit location behind the binary value of one in read shift register $SR_{RD}$. If this occurs when the value of one in write shift register $SR_{WT}$ is positioned at location $SR_{WT}[6]$ and the value of one in read shift register $SR_{RD}$ is positioned at location $SR_{RD}[7]$, then AND gate $18_{AND5}$ will assert the NF signal, thereby indicating a near-full status of FIFO memory 12. Conversely, if over time read shift register $SR_{RD}$ advances at a greater rate than write shift register $SR_{WT}$, then the binary value of one in read shift register $SR_{RD}$ at some point will become positioned at one bit location behind the binary value of one in write shift register $SR_{WT}$. If this occurs when the value of one in read shift register $SR_{RD}$ is positioned at location $SR_{RD}[6]$ and the value of one in write shift register $SR_{WT}$ is positioned at location $SR_{WT}[7]$, then AND gate $18_{AND4}$ will assert the NE signal, thereby indicating a near-empty status of FIFO memory 12.

From the above, one skilled in the art that the scope of the present inventive embodiments span numerous examples. In each, a known predetermined shifting binary pattern is used to correspond to a FIFO pointer. With knowledge of that pattern, circuitry is included to detect the relative position of one FIFO pointer (e.g., write) with respect to the other FIFO pointer (e.g., read). The above examples illustrate that a differing number of binary ones and zeroes may be used to provide differing patterns. With more than one binary one in a given pattern, then a same bit position in each shift register may be used to provide a basis of comparison as one pattern approaches, in time, the other, such as shown in systems $10_1$ and $10_2$. Indeed, the use of more than one binary value of one in the shift patterns in these examples provides in effect history information, relative to the binary value of one that corresponds to a pointer. This history provides a basis from which a given state of the two shift registers may be analyzed to determine which FIFO pointer recently advanced toward the other. Alternatively, even with a single binary one in each shift register, such as shown for system $10_4$, the passage of one shift pattern relative to the other in time may be detected, provided that the detection is based on a different bit location in one shift register versus the other. Lastly, system $10_3$ illustrates, by way of example, that either alone or in combination with other embodiments, the present inventive scope also provides for mid-full detection in the FIFO. Further, still other embodiments may be implemented with different logic gates. In addition to the benefit of providing many alternatives, the preferred embodiments provide various other benefits. As an example, with the preferred embodiments, both the read and write pointers may be represented by respective shift registers, where in those registers a single binary state (e.g., one) corresponds to the FIFO word storage location indicated by the respective word pointer. The correspondence between the single shifted binary one and the respective FIFO pointer may be direct whereby the binary one provides the FIFO pointer or indirect whereby the binary one tracks the FIFO pointer, such as being advanced each time the FIFO pointer is advanced (or once for every R times the FIFO pointer is advanced). Moreover, note that the correspondence between the single shifted binary one and the respective FIFO pointer may involve an offset between the two. In other words, the preceding has demonstrated examples where the binary value of one has a same bit location in a shift register as the corresponding word storage location in FIFO memory 12, that is, at a bit location m in a shift register corresponds to a pointer indication of word storage location m in FIFO memory 12. Alternatively, the selected value of one (or zero) may still correspond to a word storage location with a known offset as between the bit locations in the shift register and the word storage location in FIFO memory 12. As another example of the inventive benefits, with the shifted binary value and pointer correspondence, an additional aspect permits comparison of the binary states in the two shift registers so that the relative advancement in time, of the corresponding pointers, may be evaluated so as to detect near-full, near-empty, or mid-full status of the FIFO being operated according to those pointers. As still another example, the detection may be achieved using a minimal amount of logic, and with signals passing serially through only a single stage of logic (e.g., AND) and without requiring a complex capture of an entire pointer vector in one clock domain and the transfer of that vector into the other pointer's domain so as to detect FIFO status. As yet another example, the preferred embodiments are readily scalable for different sized FIFOs having differing number of word storage locations and differing numbers of word sizes. In all such approaches, further benefits are realized in that the overall size, complexity, power consumption, and cost of the FIFO and hence the system using the FIFO is reduced. As another example, the preferred embodiments include variations described above, where certain of those variations may be further applied within the illustrated embodiments. Still further, other examples exist and/or may be ascertained by one skilled in the art. For example, while the binary value of one has been shown to be the minority value in each shift register and corresponding to the location of the respective word storage location, a simple complement may be made to the above illustrations where the majority of the bits in each shift register are binary ones while a binary zero, with or without additional zeroes, corresponds to the pointer location of the respective word storage location in FIFO memory 12. Thus, these examples provide yet other bases from which one skilled in the art may ascertain yet other benefits and variations, and indeed while the present embodiments have been described in detail, various substitutions, modifications or alterations could be made to the descriptions set forth above without departing from the inventive scope which is defined by the following claims.

The invention claimed is:

1. An electronic device, comprising:
   a memory structure comprising an integer M of word storage locations;
   a write shift register for storing a sequence of bits, wherein the sequence in the write shift register comprises a number of bits equal to a ratio of $1/R_1$ times the integer M;
   circuitry for providing a write clock cycle to the write shift register for selected write operations with respect to any of the word storage locations;
   wherein in response to each write clock cycle, received from the circuitry for providing the write clock cycle, the write shift register shifts the sequence in the write shift register;
   wherein one bit in the sequence in the write shift register corresponds to an indication of one of the memory word storage locations into which a word will be written;
   a read shift register for storing a sequence of bits, wherein the sequence in the read shift register comprises a number of bits equal to a ratio of $1/R_2$ times the integer M;
   circuitry for providing a read clock cycle to the read shift register for selected read operations with respect to any of the word storage locations;
   wherein in response to each read clock cycle, received from the circuitry for providing the read clock cycle, the read shift register shifts the sequence in the read shift register;
   wherein one bit in the sequence in the read shift register corresponds to an indication of one of the memory word storage locations from which a word will be read; and
   circuitry for evaluating continuous selected bits in the sequence in the write register relative to complementary continuous selected bits in the sequence in the read register for detecting a level of data fullness in the memory structure.

2. The device of claim 1 wherein $R_1$ equals $R_2$.

3. The device of claim 2 wherein $R_1$ and $R_2$ both equal one.

4. The device of claim 1:
   wherein the circuitry for providing a write clock cycle to the write shift register for selected write operations provides a write clock cycle for every $R_1$ write operations with respect to any of the word storage locations; and
   wherein the circuitry for providing a read clock cycle to the read shift register for selected read operations provides a read clock cycle for every $R_2$ read operations with respect to any of the word storage locations.

5. The device of claim 1 wherein the circuitry for evaluating selected bits comprises circuitry for monitoring positioning of the sequence in the write shift register relative to positioning of the sequence in the read shift register.

6. The device of claim 5 wherein the circuitry for evaluating provides a signal in response to detecting that the positioning of the sequence in the write shift register is approaching the positioning of the sequence in the read shift register so as to indicate that the M storage locations are approaching a data full status.

7. The device of claim 5 wherein the circuitry for evaluating provides a signal in response to detecting that the positioning of the sequence in the read shift register is approaching the positioning of the sequence in the write shift register so as to indicate that the M storage locations are approaching a data empty status.

8. The device of claim 1 wherein each of the write shift register and the read shift register comprises a wraparound shift register.

9. The device of claim 1 wherein the circuitry for evaluating provides a signal indicating the level of data fullness in the memory structure in response to a single logic gate connected to a single bit in the read shift register and a single bit in the write shift register.

10. The device of claim 1:
   wherein one bit in the sequence in the write shift register corresponds to an indication of one of the memory word storage locations into which a word will be written by providing a write pointer to the one of the memory word storage locations into which a word will be written; and
   wherein one bit in the sequence in the read shift register corresponds to an indication of one of the memory word storage locations from which a word will be read by providing a read pointer to the one of the memory word storage locations from which a word will be read.

11. The device of claim 1:
   wherein one bit in the sequence in the write shift register corresponds to an indication of one of the memory word storage locations into which a word will be written by tracking a write pointer that indicates the one of the memory word storage locations into which a word will be written; and
   wherein one bit in the sequence in the read shift register corresponds to an indication of one of the memory word storage locations from which a word will be read by tracking a read pointer that indicates the one of the memory word storage locations from which a word will be read.

12. An electronic device comprising:
   a memory structure comprising an integer M of word storage locations;
   a write shift register for storing a sequence of bits, wherein the sequence in the write shift register comprises a number of bits equal to a ratio of $1/R_1$ times the integer M;
   circuitry for providing a write clock cycle to the write shift register for selected write operations with respect to any of the word storage locations;
   wherein in response to each write clock cycle, received from the circuitry for providing the write clock cycle, the write shift register shifts the sequence in the write shift register;
   wherein one bit in the sequence in the write shift register corresponds to an indication of one of the memory word storage locations into which a word will be written;
   a read shift register for storing a sequence of bits, wherein the sequence in the read shift register comprises a number of bits equal to a ratio of $1/R_2$ times the integer M;
   circuitry for providing a read clock cycle to the read shift register for selected read operations with respect to any of the word storage locations;
   wherein in response to each read clock cycle, received from the circuitry for providing the read clock cycle, the read shift register shifts the sequence in the read shift register;
   wherein one bit in the sequence in the read shift register corresponds to an indication of one of the memory word storage locations from which a word will be read; and
   circuitry for evaluating selected bits in the sequence in the write register relative to selected bits in the sequence in the read register for detecting a level of data fullness in the memory structure,
   wherein the sequence in the write shift register comprises two contiguous bits of a first binary value and a plurality of contiguous bits of a second binary value that is complementary to the first binary value; and
   wherein the sequence in the read shift register comprises two contiguous bits of the first binary value and a plurality of contiguous bits of the second binary value.

13. The device of claim 12 wherein the circuitry for evaluating comprises an AND gate having an input coupled to a selected bit location in the read shift register and having an input coupled to a selected bit location in the write shift register, wherein the selected bit locations in the read and write shift registers are at a same relative bit location in each of the read and write shift registers.

14. The device of claim 13 wherein the circuitry for evaluating further comprises circuitry for evaluating a binary value in one of the write or read shift register at a bit location immediately following, with respect to shifting direction, the selected bit location.

15. An electronic device comprising:
   a memory structure comprising an integer M of word storage locations;
   a write shift register for storing a sequence of bits, wherein the sequence in the write shift register comprises a number of bits equal to a ratio of b $1/R_1$ times the integer M;
   circuitry for providing a write clock cycle to the write shift register for selected write operations with respect to any of the word storage locations;
   wherein in response to each write clock cycle, received from the circuitry for providing the write clock cycle, the write shift register shifts the sequence in the write shift register;
   wherein one bit in the sequence in the write shift register corresponds to an indication of one of the memory word storage locations into which a word will be written;
   a read shift register for storing a sequence of bits, wherein the sequence in the read shift register comprises a number of bits equal to a ratio of $1/R_2$ times the integer M;
   circuitry for providing a read clock cycle to the read shift register for selected read operations with respect to any of the word storage locations;
   wherein in response to each read clock cycle, received from the circuitry for providing the read clock cycle, the read shift register shifts the sequence in the read shift register;
   wherein one bit in the sequence in the read shift register corresponds to an indication of one of the memory word storage locations from which a word will be read; and circuitry for evaluating selected bits in the sequence in the write register relative to selected bits in the sequence in the read register for detecting a level of data fullness in the memory structure, wherein the sequence in the write shift register comprises three contiguous bits of a first binary value and a plurality of contiguous bits of a second binary value that is complementary to the first binary value; and wherein the sequence in the read shift register comprises three contiguous bits of the first binary value and a plurality of contiguous bits of the second binary value.

16. The device of claim 15 wherein the circuitry for evaluating comprises:

an AND gate having an input coupled to a selected bit location in the read shift register and having an input coupled to a selected bit location in the write shift register, wherein the selected bit locations in the read and write shift registers are at a same relative bit location in each of the read and write shift registers; and circuitry for evaluating a value in one of the write or read shift register at a bit location spaced two bit locations, with respect to shifting direction, from the selected bit location.

17. An electronic device, comprising:

a memory structure comprising an integer M of word storage locations;

a write shift register for storing a sequence of bits, wherein the sequence in the write shift register comprises a number of bits equal to a ratio of $1/R_1$ times the integer M;

circuitry for providing a write clock cycle to the write shift register for selected write operations with respect to any of the word storage locations;

wherein in response to each write clock cycle, received from the circuitry for providing the write clock cycle, the write shift register shifts the sequence in the write shift register;

wherein one bit in the sequence in the write shift register corresponds to an indication of one of the memory word storage locations into which a word will be written;

a read shift register for storing a sequence of bits, wherein the sequence in the read shift register comprises a number of bits equal to a ratio of $1/R_2$ times the integer M;

circuitry for providing a read clock cycle to the read shift register for selected read operations with respect to any of the word storage locations;

wherein in response to each read clock cycle, received from the circuitry for providing the read clock cycle, the read shift register shifts the sequence in the read shift register;

wherein one bit in the sequence in the read shift register corresponds to an indication of one of the memory word storage locations from which a word will be read; and circuitry for evaluating selected bits in the sequence in the write register relative to selected bits in the sequence in the read register for detecting a level of data fullness in the memory structure, wherein the circuitry for evaluating provides a signal in response to detecting that the positioning of the sequence in the write shift register relative to the positioning of the sequence in the read shift register indicates that the one of the memory word storage locations into which a word will be written is M/2 storage locations away from the one of the memory word storage locations from which a word will be read.

18. The device of claim 17:

wherein the sequence in the write shift register comprises three contiguous bits of a first binary value and a plurality of contiguous bits of a second binary value that is complementary to the first binary value; and wherein the sequence in the read shift register comprises three contiguous bits of the first binary value and a plurality of contiguous bits of the second binary value.

19. The device of claim 18 wherein the circuitry for evaluating comprises an AND gate having an input coupled to a selected bit location in the read shift register and having an input coupled to a selected bit location in the write shift register, wherein the selected bit locations in the read and write shift registers are at a distance of M/2 locations from one another.

20. The device of claim 18 wherein the circuitry for evaluating comprises:

an AND gate having an input coupled to a selected bit location in the read shift register and having an input coupled to a selected like bit location in the write shift register; and circuitry for evaluating a data state in the read shift register at a bit location located at two lesser significant locations relative to the selected bit location in the read shift register.

21. A method of operating an electronic device, the electronic device comprising a memory structure comprising an integer M of word storage locations, the method comprising:

storing a sequence of bits in a write shift register, wherein the sequence in the write shift register comprises a number of bits equal to a ratio of $1/R_1$ times the integer M;

providing a write clock cycle to the write shift register for selected write operations with respect to any of the word storage locations;

in response to each write clock cycle, received from the circuitry for providing the write clock cycle, shifting the sequence in the write shift register;

wherein one bit in the sequence in the write shift register corresponds to an indication of one of the memory word storage locations into which a word will be written;

storing a sequence of bits in a read shift register, wherein the sequence in the read shift register comprises a number of bits equal to a ratio of $1/R_2$ times the integer M;

providing a read clock cycle to the read shift register for selected read operations with respect to any of the word storage locations;

in response to each read clock cycle, received from the circuitry for providing the read clock cycle, shifting the sequence in the read shift register;

wherein one bit in the sequence in the read shift register corresponds to an indication of one of the memory word storage locations from which a word will be read; and evaluating continuous selected bits in the sequence in the write register relative to complimentary continuous selected bits in the sequence in the read register for detecting a level of data fullness in the memory structure.

22. The method of claim 21 wherein $R_1$ equals $R_2$.

23. The method of claim 22 wherein $R_1$ and $R_2$ both equal one.

24. The method of claim 21:
  wherein the step of providing a write clock cycle to the write shift register for selected write operations provides a write clock cycle for every $R_1$ write operations with respect to any of the word storage locations; and
  wherein the step of for providing a read clock cycle to the read shift register for selected read operations provides a read clock cycle for every $R_2$ read operations with respect to any of the word storage locations.

25. The method of claim 21 wherein the step of evaluating selected bits comprises monitoring positioning of the sequence in the write shift register relative to positioning of the sequence in the read shift register.

26. The method of claim 25 wherein the step of evaluating provides a signal in response to detecting that the positioning of the sequence in the write shift register is approaching the positioning of the sequence in the read shift register so as to indicate that the M storage locations are approaching a data full status.

27. The method of claim 25 wherein the step of evaluating provides a signal in response to detecting that the positioning of the sequence in the read shift register is approaching the positioning of the sequence in the write shift register so as to indicate that the M storage locations are approaching a data empty status.

28. A method of operating an electronic device, the electronic device comprising a memory structure comprising an integer M of word storage locations, the method comprising:
  storing a sequence of bits in a write shift register, wherein the sequence in the write shift register comprises a number of bits equal to a ratio of $1/R_1$ times the integer M;
  providing a write clock cycle to the write shift register for selected write operations with respect to any of the word storage locations;
  in response to each write clock cycle, received from the circuitry for providing the write clock cycle, shifting the sequence in the write shift register;
  wherein one bit in the sequence in the write shift register corresponds to an indication of one of the memory word storage locations into which a word will be written;
  storing a sequence of bits in a read shift register, wherein the sequence in the read shift register comprises a number of bits equal to a ratio of $1/R_2$ times the integer M;
  providing a read clock cycle to the read shift register for selected read operations with respect to any of the word storage locations;
  in response to each read clock cycle, received from the circuitry for providing the read clock cycle, shifting the sequence in the read shift register;
  wherein one bit in the sequence in the read shift register corresponds to an indication of one of the memory word storage locations from which a word will be read; and
  evaluating selected bits in the sequence in the write register relative to selected bits in the sequence in the read register for detecting a level of data fullness in the memory structure
  wherein the step of evaluating provides a signal in response to detecting that the positioning of the sequence in the write shift register relative to the positioning of the sequence in the read shift register indicates that the one of the memory word storage locations into which a word will be written is M/2 storage locations away from the one of the memory word storage locations from which a word will be read.

* * * * *